United States Patent

[11] 3,592,378

[72] Inventor Frank A. Petraglia
 New York, N.Y.
[21] Appl. No. 769,071
[22] Filed Oct. 21, 1968
[45] Patented July 13, 1971
[73] Assignee Metro-Tel Corp.
 Westbury, N.Y.

[54] SOLDERING IRON
 8 Claims, 3 Drawing Figs.
[52] U.S. Cl. .................................................. 228/51,
 158/24, 219/229, 228/53, 228/54
[51] Int. Cl. ................................................ B23k 3/02
[50] Field of Search .......................................... 228/51, 53,
 54, 55, 20, 21; 219/229; 126/263; 42/67, 70

[56] References Cited
UNITED STATES PATENTS
1,602,266 10/1926 Jarkovsky .................... 219/229
2,423,900 7/1947 Parker ......................... 228/53
2,589,509 3/1952 Petraglia ..................... 158/24
2,624,332 1/1953 Lang .......................... 126/263
2,824,201 2/1958 McDaniel .................... 228/53
3,120,713 2/1964 Lizza et al. ................. 42/70.0
3,237,335 3/1966 Kerr .......................... 42/70.0

Primary Examiner—John F. Campbell
Assistant Examiner—Robert J. Craig
Attorney—Norman N. Holland ABSTRACT: A portable soldering iron having a hollow chamber next to the soldering tip which holds a cartridge that contains heat-producing chemicals. A spring-pressed firing pin is placed in a bore in the handle of the iron and is adapted to pass through a small aperture to strike the cartridge causing the chemicals to ignite to produce heat which is conducted to the soldering tip.

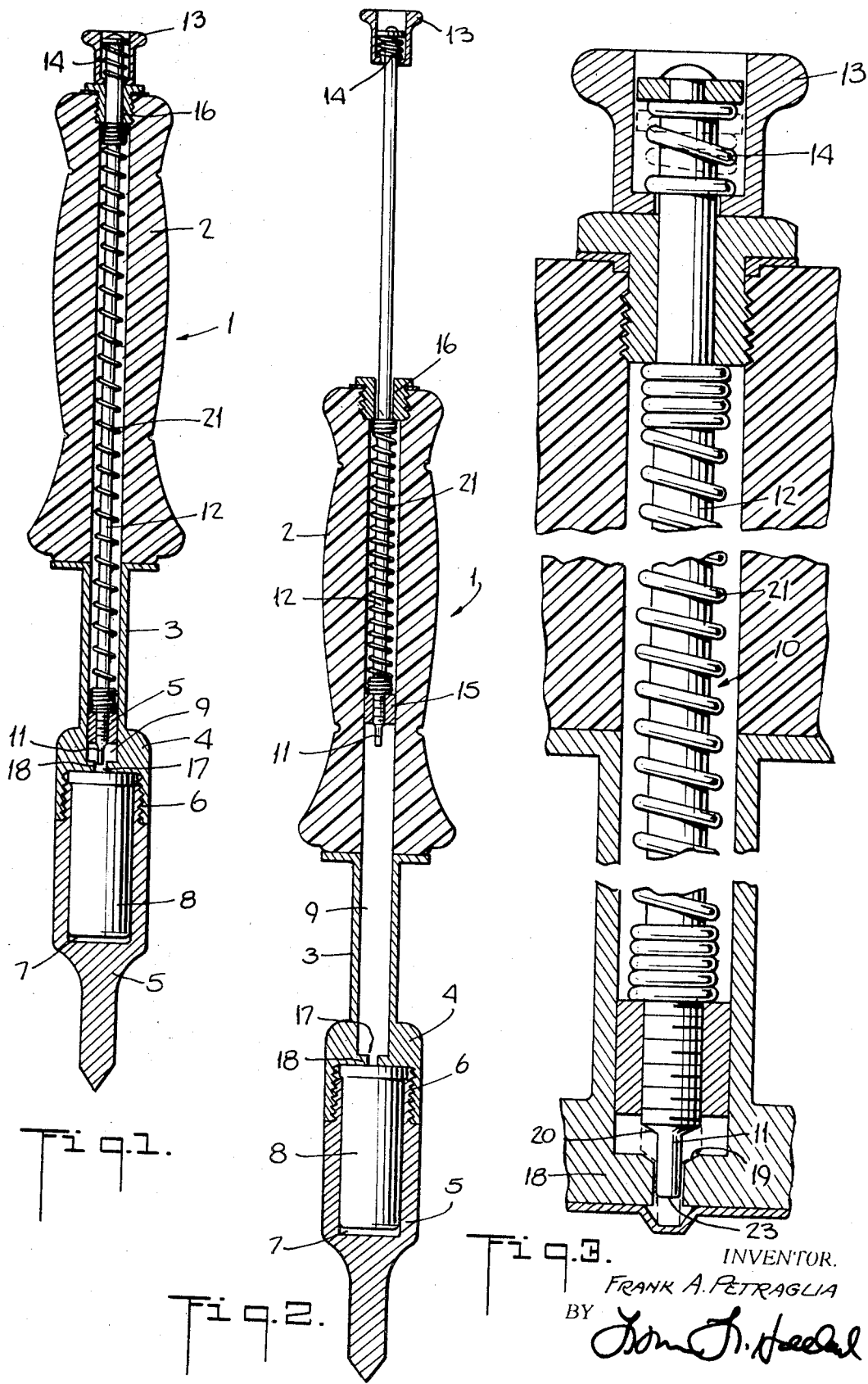

SOLDERING IRON

The present invention is an improvement over my earlier portable soldering iron which was the subject of U.S. Pat. No. 2,589,509 dated Mar. 16, 1952. The soldering iron disclosed in that patent utilized a hollow handle having a spring-pressed firing pin therein adapted to puncture a cartridge which contains heat-producing chemicals. The cartridge was mounted in a chamber which had an open back communicating with the hollow handle. It has been found that sometimes the heat generated was conducted up into the handle and plunger assembly, which not only created the danger of burning the operator, but also resulted in loss of useable heat.

The present invention is directed to an improved portable soldering iron that does not have this shortcoming.

Therefore, it is an object of this invention to provide a portable soldering iron having an internal, chemical heat-producing means which is safer to use.

It is a further object of this invention to provide a portable soldering iron having internal, chemical heat-producing means which directs a higher proportion of heat to the soldering tip.

It is yet another object of this invention to provide a portable soldering iron having internal, chemical heat-producing means which avoids conducting heat to either the handle or to the plunger means that is used to activate the heat-producing means.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a sectional view of the soldering iron of this invention with the plunger and firing-pin assembly in its normal rest position;

FIG. 2 is a sectional view of the soldering iron of this invention with the plunger and firing-pin assembly in its contracted position just prior to activation of the heat-generating means; and FIG. 3 is an enlarged fragmented sectional view of the plunger and firing-pin assembly showing the firing-pin in solid lines at its normal position and in dotted lines at its position when fired to activate the heat-generating means.

The soldering iron of the present invention comprises a handle 2 of heat-resistant material. Wood and plastic are suitable materials for use in such a handle. A metallic connecting member 3 joins the handle 2 and hollow metal cap portion 4. The metal used in the cap portion 4 and connecting member 3 should be relatively nonheat conducting. The cap portion 4 is hollow and may be joined to a hollow soldering tip 5 by means of screw threads 6 so that a hollow chamber 7 is formed. The chamber 7 is adapted to receive the heat-generating means, which in the preferred embodiment comprises a cartridge 8 which holds heat-producing chemicals.

A central bore 9 passes through handle 2, metallic tubular member 3 and the upper part of cap portion 4. The bore 9 accommodates a spring-pressed firing-pin assembly 10 comprising a firing pin 11 threadably connected to a rod 12 having a plunger knob 13 mounted on the outside to handle 2. The plunger knob 13 is resiliently coupled to the rod 12 by means of a spring 14.

When the firing-pin assembly 10 is at its rest position (as illustrated in FIG. 1), the ends of a spring 21 are contained between stops 15 and 16 within the bore 9. When the plunger knob 13 is pulled away from handle 2, the spring 21 is compressed between the stops 15 and 16, as shown in FIG. 2, as the rod 12 is pulled through stop 16 and away from handle 2. Upon release of the knob 13, the rod 12 and firing pin 11 are propelled forward by the compressed spring 21 towards chamber 7 that contains the cartridge 8. The force of the forward motion carries the firing pin 11 to the position shown in dotted lines in FIG. 3. At this position tip portion 23 of the pin will strike the cartridge 8 thus activating the heat-producing chemicals contained therein to produce heat. The tip 5 which in the preferred embodiment is formed of a highly heat-conductive metal, such as copper, becomes hot and can be used for soldering.

In order to prevent heat from escaping upwardly through the bore 9, a heat-protective wall 18 is provided to close off from chamber 7 and a narrow aperture 17 is provided in wall 18 for the pin 11 to pass through. The presence of the wall, which is formed of relatively nonheat-conductive metal, effectively blocks heat from escaping through the bore 9.

As indicated above, the firing pin 11 is moved by the force of the spring 12 beyond the opening 17. In order to return the firing pin 11 to its normal rest position, shown in solid lines in FIG. 3, and prevent it from remaining in a protruding position, the spring 14 is provided at the top. When the tip portion 23 of firing pin 11 strikes the container 8, spring 14 is compressed between stop 24 which is connected to rod 12 and the bottom surface 25 which acts as a stop of knob 13 as shown in dotted lines in FIG. 3. The forward motion of rod 12 is responsible for stop 24 slidably moving inside cavity 26 in the knob 13. Compressed spring 14 returns to its normal position by pushing stop 24 and connecting rod 12 back to their normal rest positions. This action pulls firing pin 11 to its normal rest position as well. Bevelled edges 19 may be placed adjacent the aperture to fit the curve 20 of the firing pin when the latter strikes the wall at the end of its travel, as shown in FIG. 3.

Such a construction insures that a greater proportion of heat will be conducted to soldering tip 5 and minimizes the danger of burns from overheating of the handle or firing assembly.

As various changes may be made in the form, construction and arrangements of the parts herein without departing from the spirit and scope of the invention and without sacrificing any of the advantages, it is to be understood that all matter herein is to be interpreted as illustrative and not in a limiting sense.

Having thus described my invention, I claim:

1. A soldering iron comprising a handle, a hollow chamber for holding a heat-generating source, hollow bore means extending from said handle to said hollow chamber and communicating therewith, said hollow chamber being of greater width than said bore, the hollow chamber comprising a soldering tip portion for focusing the heat that is generated, a rod slidably mounted within the bore means, a firing pin at the forward end of said rod, spring means for causing the firing pin to move toward the hollow chamber, a protective wall separating the bore means and the hollow chamber, a restricted opening in said wall to cause the bore means and the hollow chamber to communicate with each other and to allow the firing pin to pass therethrough and to enter the hollow chamber in said restricted opening being smaller than said bore means, and said firing pin being substantially the same size as and substantially closing said restricted opening.

2. A soldering iron as claimed in claim 1, wherein the handle is made of a heat-resistant material.

3. A soldering iron as claimed in claim 2, wherein the soldering tip, the chamber, the firing pin and handle are all axially aligned.

4. A soldering iron as claimed in claim 1, wherein the heat-generating source is a cartridge having heat-generating materials contained therein.

5. A soldering iron as claimed in claim 1, wherein the hollow chamber comprises a cap portion removably mounted to a hollow tip.

6. A soldering iron as claimed in claim 1, wherein the opening is circular.

7. A soldering iron as claimed in claim 1, wherein the soldering tip comprises copper.

8. A soldering iron as claimed in claim 1, wherein spring means operatively connected to said firing pin are provided for returning the firing pin to its normal rest position after passing through the opening.